United States Patent [19]

Manz

[11] Patent Number: 4,906,598
[45] Date of Patent: Mar. 6, 1990

[54] THERMAL STORAGE BRICK

[76] Inventor: Oscar E. Manz, 2512 8th Ave. N., Grand Forks, N. Dak. 58201

[21] Appl. No.: 272,732

[22] Filed: Nov. 17, 1988

[51] Int. Cl.$^4$ ............................................. C04B 35/14
[52] U.S. Cl. .................................... 501/129; 501/130
[58] Field of Search ............... 501/109, 122, 127, 129, 501/130, 131, 141, 144, 145, 112

[56] References Cited

U.S. PATENT DOCUMENTS

| | | | |
|---|---|---|---|
| 875,662 | 12/1907 | Houze | 501/141 |
| 921,838 | 5/1909 | Houze | 501/129 |
| 2,280,367 | 3/1940 | Barton | 501/112 |
| 3,216,838 | 11/1965 | Birch et al. | 501/112 |
| 3,785,842 | 1/1974 | Murray | 501/112 |
| 3,860,414 | 1/1975 | Lang et al. | 524/420 |
| 4,303,448 | 12/1981 | Palmour, III et al. | 501/129 |

FOREIGN PATENT DOCUMENTS 1453764  9/1966  France ............................... 501/112
1189849  11/1985  U.S.S.R. .

Primary Examiner—William R. Dixon, Jr.
Assistant Examiner—Susan Hollenbeck
Attorney, Agent, or Firm—Zarley, McKee, Thomte, Voorhees & Sease

[57] ABSTRACT

A thermal storage brick for use with thermal storage heaters comprised of predetermined amounts of crushed taconite pellets, clay and talc. The ingredients are formed into a brick shape under approximately 4000 p.s.i. and are fired at approximately 2150° F. and are allowed to soak for approximately five hours.

5 Claims, 1 Drawing Sheet

U.S. Patent  Mar. 6, 1990  4,906,598

THERMAL STORAGE BRICK

BACKGROUND OF THE INVENTION

This invention relates to a thermal storage brick for use with thermal storage heaters.

Electric thermal storage heaters convert electricity into heat during off-peak hours and store that heat in specially-designed, high-density bricks capable of storing vast amounts of heat for extended periods of time. During the day, as a room thermostat calls for heat, small fans in the heater circulate the stored heat evenly and quietly throughout a room. Electric thermal storage heaters provide clean, quiet, odorless and very efficient electric heat at rates 40% to 60% lower than usual on-peak rates. One type of such an electric thermal storage heater is manufactured by Steffes ETS, Inc., Post Office Box 327, Dickinson, N.Dak. 58601.

The design of an electric thermal storage heater involves several important factors. One factor is that the unit must be slim while having high heat storage capacity therefore requiring that the bricks utilized therein have the proper density-specific heat combination to yield the most heat storage per cubic foot. Another important factor is that the material utilized in the brick must be capable of withstanding temperatures of at least 1400° F. through repeated thermal cycling temperatures normally between 200° F. and 1400° F. Still another important factor is that the brick must withstand the constant cycling without deterioration of the brick. Yet another important factor is that the brick must be economical of manufacture.

Therefore, it is a principal object of the invention to provide an improved heat storage brick for use with electric thermal storage heaters.

Yet another object of the invention is to provide a heat storage brick which is able to provide the maximum heat density while yet being capable of withstanding 1400° F. through repeated thermal cycling between 200° F. and 1400° F.

Still another object of the invention is to provide a thermal storage brick which is economical of manufacture.

Still another object of the invention is to provide a thermal storage brick which has an improved increase in heat density as compared to previous thermal storage bricks.

Still another object of the invention is to provide a thermal storage brick which is comprised of particular ingredients to simplify the manufacture of the same.

Still another object of the invention is to provide a thermal storage brick which is durable.

These and other objects will be apparent to those skilled in the art.

SUMMARY OF THE INVENTION

Figure 1:
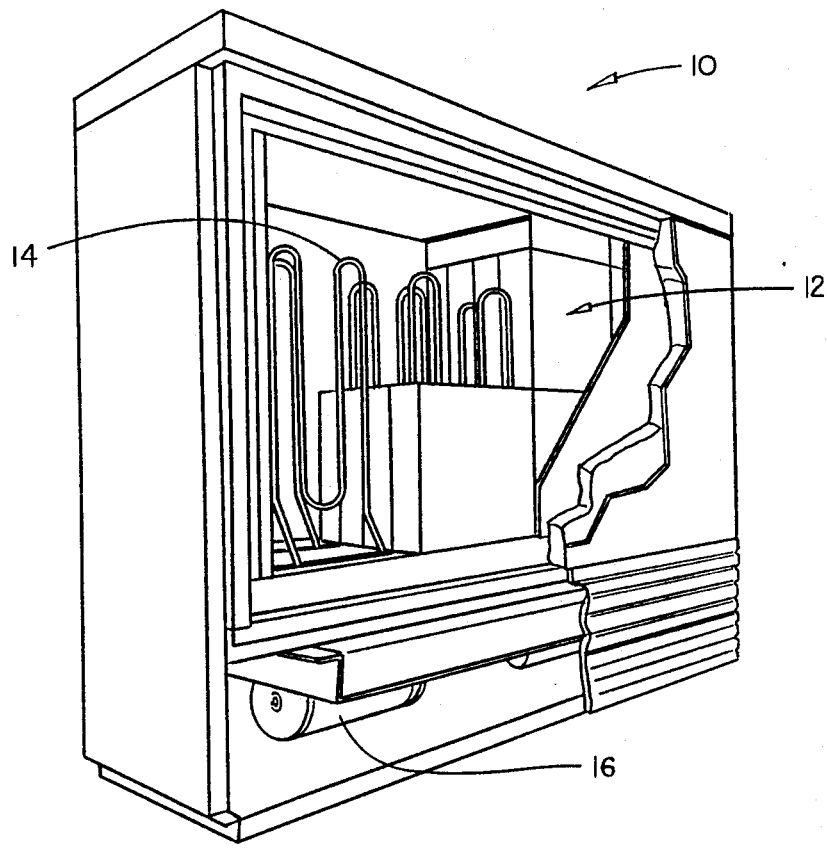
FIG. 1 is a partial cut-away view of an electric thermal storage heater.
Figure 2:
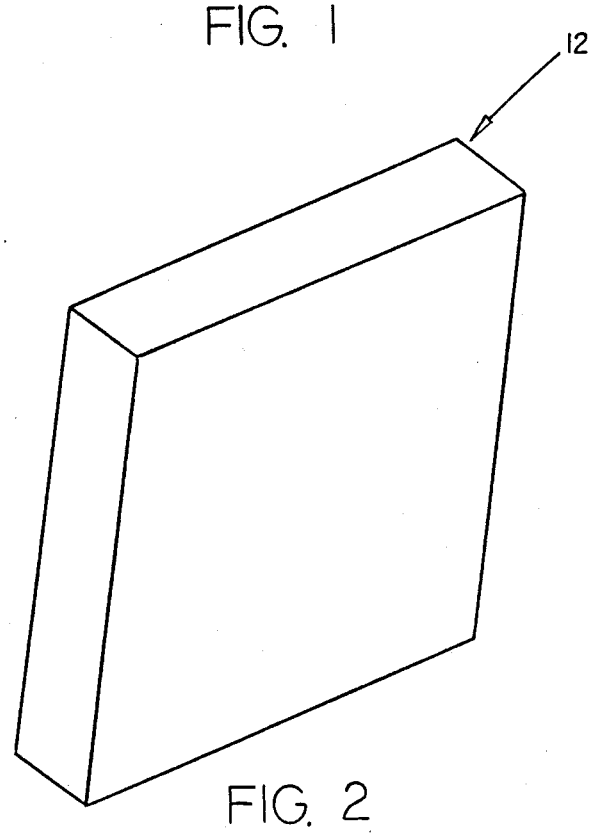
FIG. 2 is a perspective view of the brick of this invention.

A thermal storage brick is described which is comprised of crushed taconite pellets, clay and talc. The taconite pellets are crushed to provide a particle size of approximately ⅛ inch to 3/16 inch cross-sectional length. Preferably, the crushed taconite pellets comprise 85%±2% of the total composition of the brick. The clay preferably comprises 10%±2% of the total composition of the brick and is preferably comprised of Brick-Ez and Hebron Plastic Clay. Preferably, the talc comprises 5%±1% of the total composition of the brick.

The crushed taconite pellets, clay and talc are thoroughly mixed and are placed within a brick mold and are formed utilizing a brick press capable of exerting pressures up to 4000 p.s.i. The bricks are fired to approximately 2150° F. and allowed to soak for approximately five hours.

DESCRIPTION OF THE PREFERRED EMBODIMENT

The numeral 10 refers to an electric thermal storage heater such as that manufactured by Steffes ETS, Inc. of Dickinson, N.Dak. 58601. The heater 10 includes a plurality of thermal storage bricks 12 which are heated by heating elements 14 during off-peak hours and are normally capable of heating the bricks 12 to approximately 1400° F. When it is desired to utilize the heater 10, a small fan 16 is energized to pass air over the heated bricks so that heat may be discharged from the heater 10.

Each of the thermal storage bricks 12 is preferably comprised of crushed taconite pellets, clay and talc in the ranges set forth in Example I hereinbelow.

| EXAMPLE I | | |
|---|---|---|
| Ingredients | Possible Range by Wt. | Preferred Proportion by Wt. |
| Crushed Taconite Pellets | 83.0–87.0% | 85% |
| Clay | 8.0–12.0% | 10% |
| Brick-Ez Clay Conditioner 20.0–40.0% (30 Preferred) | | |
| Hebron Plastic Clay 60.0–80.0% (70 Preferred) | | |
| Talc | 4.0–6.0% | 5.0% |

As seen in Example I, the crushed taconite pellets preferably comprise 85% of the total composition of the brick but have a possible range of 83–87% of the total composition of the brick. The clay portion of the brick preferably comprises 10% of the total composition of the brick but may have a possible range of 8.0–12.0%. The talc portion of the brick preferably comprises 5.0% of the total composition of the brick but may comprise 4.0–6.0% of the total composition of the brick. Although the preferred proportions of 85%, 10% and 5% result in the most satisfactory thermal storage brick, the possible ranges of 83–87%, 8–12% and 4–6% set forth in Example I also result in a satisfactory brick.

As also seen in Example I, the clay is preferably comprised of 30% Brick-Ez and 70% Hebron Plastic Clay with possible ranges of 20–40 and 60–80 also being possible. For reference purposes, the Brick-Ez ingredient referred to above is manufactured by American Colloid Company of 1500 W. Shure Drive, Arlington Heights, Ill. under Specification Nos. 104 and 104P. Brick-Ez is a finely ground and beneficated sodium bentonite clay. Brick-Ez 104P also contains an inorganic deflocculant to speed dispersion.

The taconite pellets are crushed by any convenient means to preferably provide particles having a maximum cross-sectional length of ⅛ inch to 3/16 inch long to provide ease of formability under pressure by assuring uniformity of pressure distribution within the mold.

The taconite, clay and talc ingredients are thoroughly mixed in a conventional mixer and are then preferably placed in a brick press capable of exerting pressure up to 4000 p.s.i. The bricks are then fired to 2150° F. and allowed to soak for approximately five hours.

It has been found that the bricks of this invention have a higher heat density than bricks formed from either magnesite or olivine. The bricks of this invention are relatively economical of manufacture and are fairly simple to make. The bricks of this invention have been subjected to many heat-up and cool-down cycles as well as being heated to 1600° F. and then quickly quenched in water. The bricks of this invention have not failed in the heating and cooling test and have proven to be able to take as many or more harsh water quenching cycles as other bricks.

Thus it can be seen that the thermal storage brick of this invention accomplishes at least all of its stated objectives.

I claim:

1. A thermal storage brick comprised of crushed taconite pellets, clay and talc, said pellets, clay and talc having been mixed, pressed into a brick shape and fired, said pellets comprising approximately 83.0% to 87.0% by weight of the total composition of the brick, said clay comprising approximately 8.0% to 12.0% by weight of the total composition of the brick, said talc comprising approximately 4.0% to 6.0% by weight of the total composition of the brick.

2. The thermal storage brick of claim 1 wherein said clay is comprised of approximately 20.0 to 40.0% sodium bentonite clay and 60.0% to 80.0% plastic clay.

3. The thermal storage brick of claim 1 wherein said pellets, clay and talc comprise approximately 85.0% by weight, approximately 10.0% by weight and approximately 5.0% by weight of the total composition of the brick.

4. The thermal storage brick of claim 1 wherein said pellets are crushed, prior to mixing, to create particles having a maximum cross-sectional length of ⅛ to 3/16 inch.

5. The thermal storage brick of claim 1 wherein said crushed pellets, clay and talc are pressed into a brick shape under approximately 4000 p.s.i. and are fired at approximately 2150° F. for approximately five hours.

* * * * *